(No Model.)
E. OTTO.
SPIRIT COOKING APPARATUS.
No. 451,837. Patented May 5, 1891.
FIG=1-
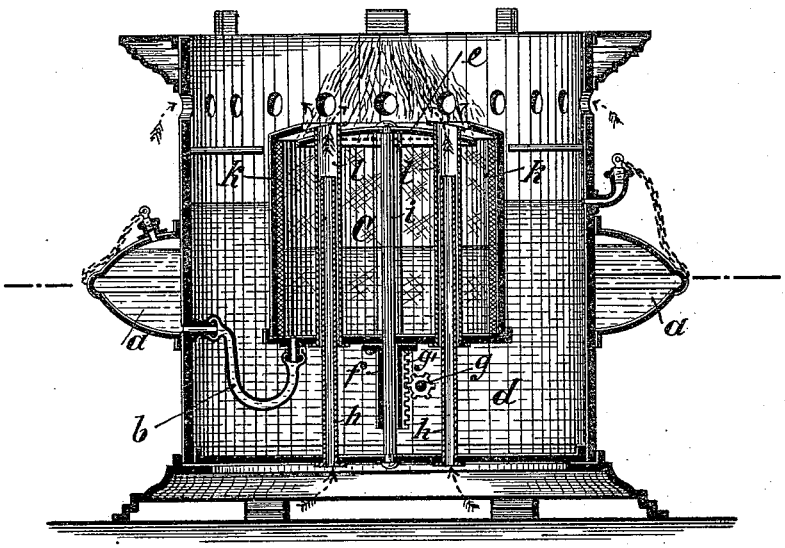
FIG=2-
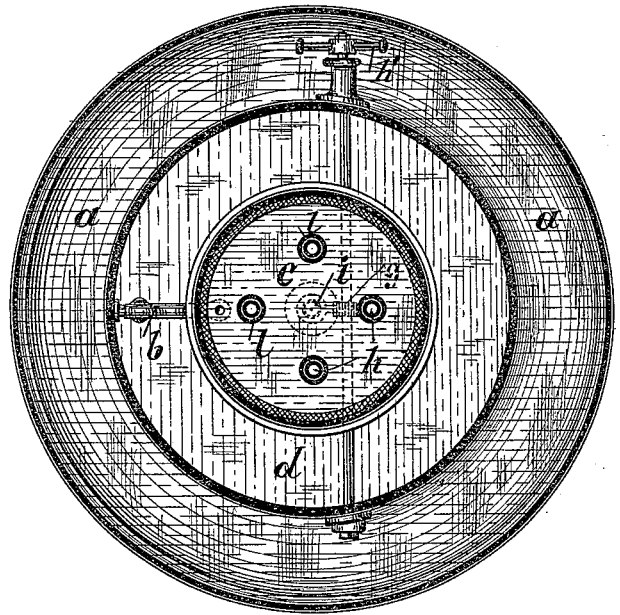
Witnesses:
Paul Kirschke
Wilhelm Kist.
Inventor:
Emil Otto
per Gerson & Sachse
His Attorneys.

UNITED STATES PATENT OFFICE.

EMIL OTTO, OF MAGDEBURG, GERMANY.

SPIRIT COOKING APPARATUS.

SPECIFICATION forming part of Letters Patent No. 451,837, dated May 5, 1891.

Application filed November 28, 1890. Serial No. 372,924. (No model.)

*To all whom it may concern:*

Be it known that I, EMIL OTTO, a subject of the Emperor of Germany, residing at Magdeburg, in the Empire of Germany, have invented a new and useful Spirit Cooking Apparatus, of which the following is a specification.

This invention relates to spirit cooking apparatus, and has for its purpose to provide an apparatus, of this order in which the liquid fuel is always kept in a cool state.

In the annexed drawings, Figure 1 is a vertical and Fig. 2 a horizontal section of the apparatus.

The improved apparatus is in the main constructed as follows: A water-reservoir $d$, of cylindric shape, is surrounded about the middle with a horizontally-secured annular reservoir $a$ for the spirits, which communicates through a tube $b$, of india-rubber, terminating at its bottom, with a fuel or burner vessel $c$, arranged in the center of the vessel $d$. The burner-plate $e$ is rigidly connected by a vertical bolt $i$ to the bottom of the vessel $d$, so as to be stationary in its position. The burner-vessel $c$ is guided on said bolt $i$ by means of a tube or sleeve $f$, centrally secured to its bottom and carrying a rack-bar $g'$, which gears into a toothed wheel or pinion $g$, connected with an outside handle $h'$, so that the burner can be raised and lowered by turning the handle $h'$ to the right or left, as the case may be. Around the inner side of the burner-vessel $c$ is placed a wick $k$, which absorbs the spirits entering into this vessel $c$. The flame of the lighted saturated wick $k$ can now be regulated by screwing or turning the burner-vessel $c$ up or down. To extinguish the flame, said vessel $c$ is so far lowered as to completely close the burner-opening by resting with its upper rim, which is correspondingly bent inward, upon the stationary burner-plate $e$. In this position the burner-vessel $c$ is sufficiently immersed in the water of the main reservoir $d$ to cool the heated spirits and prevent the same from evaporating.

The burner-vessel $c$ contains a number of tubes $l$, serving as guides for an equal number of tubes $k$, secured to the bottom of the water-reservoir $d$ and supplying air to the flame.

What I claim is—

In a spirit cooking apparatus, the combination of the vertically-movable burner-vessel $c$, having an upper inside bent rim, with the stationary burner-plate $e$, the water-reservoir $d$, the annular spirits-reservoir $a$, and the flexible tube $b$, as and for the purpose specified.

EMIL OTTO.

Witnesses:
 HEINRICH HINTZ,
 OTTO KÖRNER.